[11] 3,547,041

[72] Inventors Georgy Ignatievich Izhelya
ulitsa Malopodvalnaya, 14. kv. 13;
Konstantin Alexeevich Bykov, ulitsa
Streletskaya, 14, kv. 2; Boris Sokratovich
Veneraki, ulitsa Gorkogo, 155, kv. 28;
Alexandr Ivanovich Vishnikin, ulitsa
Belorusskaya, 1, kv. 17; Vladimir
Andreevich Mishakin, ulitsa
Selskokhozyaistvennaya,7/9, kv. 19; Sergei
Alexeevich Rebrov, ulitsa Nikolsko-
Botanicheskaya, 14, kv. 20; Itskhok
Avrumovich Spektor, ulitsa Muromskaya,
3, kv. 15; Alexandr Grigorievich
Shapovalenko, ulitsa Zatonskogo, 15/41,
kv. 25, Kiev, U.S.S.R.
[21] Appl. No. 704,836
[22] Filed Feb. 12, 1968
[45] Patented Dec. 15, 1970

[54] INDUCTION LINEAR TRACTION MOTOR FOR MONORAIL SYSTEMS
3 Claims, 5 Drawing Figs.
[52] U.S. Cl. .................................................. 104/148, 310/12
[51] Int. Cl. ......................................................... B60m 5/00, H02k 41/02
[50] Field of Search .......................................... 318/135; 310/12, 13; 104/148LM

[56] References Cited
UNITED STATES PATENTS
2,337,430  12/1943  Trombetta .................. 310/13
2,666,879   1/1954  Godsey, Jr. et al. .... 104/148(LM)(UX)

Primary Examiner—Arthur L. La Point
Assistant Examiner—George H. Libman
Attorney—Waters, Roditi, Schwartz & Nissen ABSTRACT: An induction linear traction motor for monorail systems wherein a running rail is used as the rotor, whereas stators embrace the running rail on both sides thereof, the magnetic cores of each stator being divided lengthwise into sections interconnected by means of articulated joints capable of providing relative turning movement of adjacent sections during passage of the stators along a curvilinear section of the rail with a small radius of curvature.

INDUCTION LINEAR TRACTION MOTOR FOR MONORAIL SYSTEMS

The present invention relates to induction linear traction motors employed on monorail systems.

Conventional designs of induction linear traction motors wherein the running rail is used as the rotor, employ unrolled stators capable of embracing said rail on both sides, which are provided with a rigid structure of magnetic cores.

As is known, the length of an unrolled stator as viewed in the direction of movement with constant motor power supply frequency increases with increase of the motor speed. Therefore the total length of the stator may be of the order of 1.5 to 2 m. and more, which hinders the negotiation of the motor along curves due to the fact that the air gap between the stator magnetic core and the running rail increases on the inner side of the track curvature, whereas that on the outer side decreases. Variation of the air gap magnitude in movement results in impaired traction and power performance thereof. To provide negotiation of curves by the motor without significant variation of the air gap in the case of a rigid structure of the stator magnetic core, it is necessary to increase considerably the rated magnitude of said gap which, in turn, will lead to impaired traction and power performance of the motor.

Especially abrupt variations of the air gap occur when small radii of curvature are passed (with the stator magnetic core lengths of 1.5 to 2 m. for radii of curvature of 50 to 100 m.), for example, on shunting track sections, turnouts, when the monorail lines are built in populated areas, etc. This may lead to touching of the running rail by the stator core.

The primary object of the present invention is to provide for the motor to pass small radii of monorail curvature (from 5 to 10 m.) with practically constant air gap between the stator magnetic cores which facilitate the improving of traction and power performance of the motor.

The object of the invention is accomplished by an arrangement wherein the magnetic cores of each stator are divided lengthwise in the direction of movement into separate sections which are connected with one another through articulated joints capable of providing for any section on the track curvilinear sections with small radius the possibility to turn with respect to one another.

It is expedient that each joint be made as a bushing or sleeve entering a hole arranged in protrusions of adjacent sections of the magnetic core. Moreover, it is advantageous that the articulated joint of adjacent magnetic core sections be made as a stack of overlapping laminations so as to retain the stator permeance.

The invention will be more apparent from a consideration of an examplary embodiment thereof with reference to the appended drawings, wherein.

Figure 1:
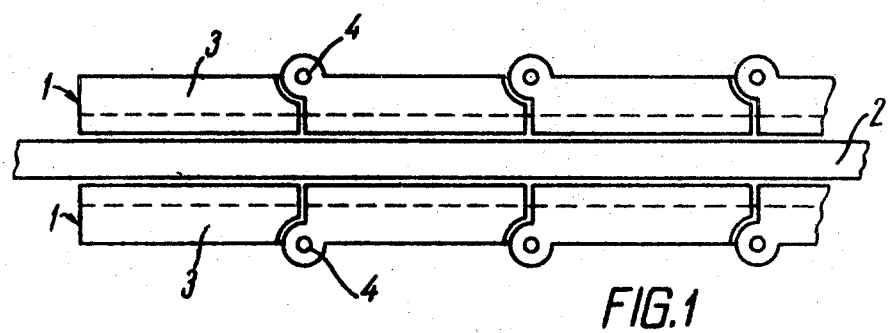
FIG. 1 is a plan view of the arrangement of magnetic core sections of the unrolled stators of the motor with respect to the running monorail.

As is seen in FIG. 1, magnetic cores 1 of the unrolled stators in an induction linear traction motor for monorail systems are arranged on both sides of a rectangular running rail 2 which serves as the rotor of the motor. To enable the motor to pass monorail sections with small radii of curvatures, the magnetic cores 1 are made of separate sections 3 connected with one another by magnetic joints. The split of the separate sections 3 of the magnetic core 1 is made in the middle portion of the stator slots. Therefore the presence of gaps between the separate sections of the magnetic cores does not affect the stator teeth permeance.

Figure 2:
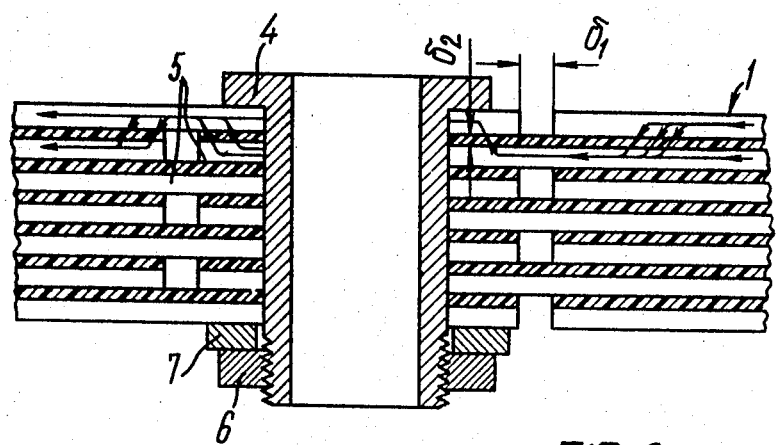
FIG. 2 is a cross section of the unrolled stator through the magnetic core articulated joint.
Figure 3:
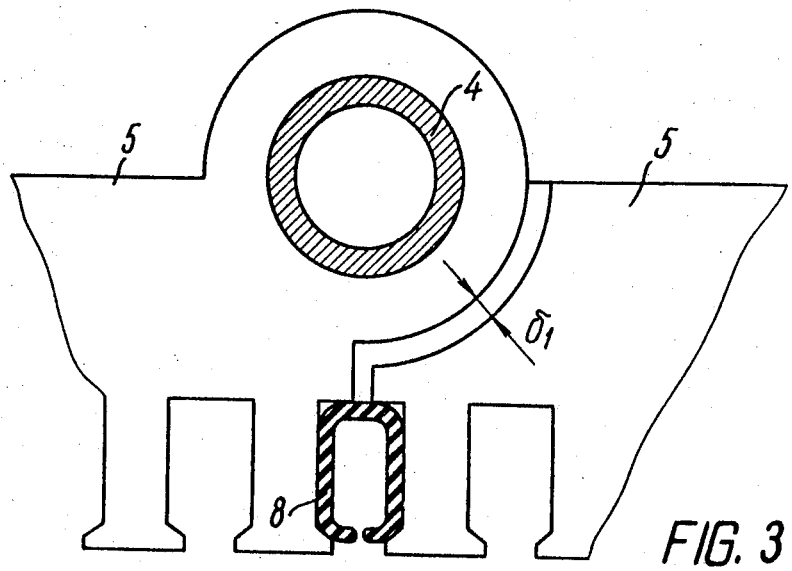
FIG. 3 is a plan view of a magnetic core articulated joint.

A joint is essentially constituted as a steel polished bushing or sleeve 4 which is fitted in holes stamped in protrusions of laminations 5 (FIGS. 2 and 3) of the magnetic cores 1. The laminations 5 of the magnetic core 1 are clamped by means of a nut 6 and a washer 7. Inside the bushing or sleeve 4 provision is made for pins capable of connecting the magnetic core sections to the motor body (not shown in the drawing).

Figure 4:
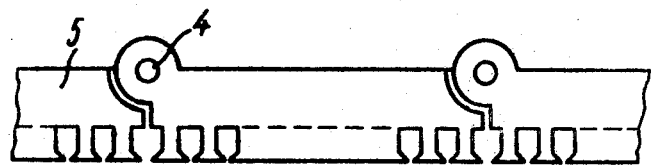
FIGS. 4 and 5 show the arrangement of laminations of stator sections for stacked magnetic cores.
Figure 5:
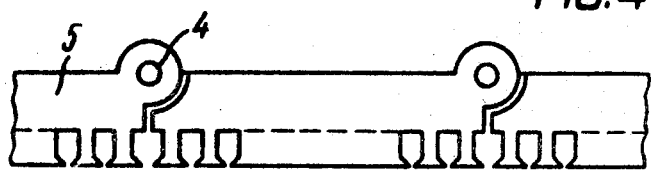

A specific feature of the articulated joint of the sections is to keep constant the permeance of the stator core in the place of the articulated joint and thus the latter is made of overlapping laminations. The arrangement of laminations is shown in FIGS. 4 and 5. Such a design of the joint allows effective manufacture not requiring that the air gap $\delta_1$ (FIGS. 2 and 3) be small. Practically, said air gap may be assumed equal to 1 to 2 mm.

If the joint is not made laminated, the entire magnetic flux in the stator core is able to pass through said gap which would considerably increase the magnetizing current of the motor.

In the proposed joint, the working gap for a magnetic flux of the stator core is air gap $\delta_2$ (FIG. 2) between the planes of laminations 5 of the stator stack which may be a small fraction of a millimeter (practically said gap may be assumed equal to the insulation layer thickness of the laminations 5).

Therefore the reluctance of a laminated joint is several hundred times smaller than that of a nonstacked joint and does not practically affect the total reluctance of the stator core.

To prevent damaging the winding in the stator slots at the places where the magnetic core sections are articulated, rigid plastic bushings or sleeves 8 (FIG. 3) are fitted into said slots said bushings or sleeves serving as slot insulation of the stator winding.

With actual curvature radii of the monorail running rail, the angle of turn of one magnetic core section of the unrolled stator with respect to the other section is only 1 or 2°, therefore the rigid bushing or sleeve 8 freely located in the slot will reliably protect the winding from damage.

Apart from its direct application, i.e. as a traction electric drive for rolling stock of monorail systems the present invention may be employed in other transport and hoisting mechanisms and devices where small radii of curvature of the running rail occur.

We claim:

1. An induction linear traction motor for monorail systems comprising a running rail as the rotor, stators embracing said running rail on both sides, said stators including magnetic cores divided lengthwise into sections, and means interconnecting said sections including articulated joints capable of providing relative turning movement of said sections to enable travel along a curvilinear rail with a small radius of curvature.

2. A motor as claimed in claim 1 wherein each said articulated joint of said stator sections comprises a bushing engaged in aligned holes provided in protrusions of adjacent sections of the stator magnetic core.

3. A motor as claimed in claim 1 wherein said magnetic cores of adjacent sections are constituted as overlapping laminations which allow for varying stator permeance at the places where said articulated joints of said sections are located.